Figure 22:
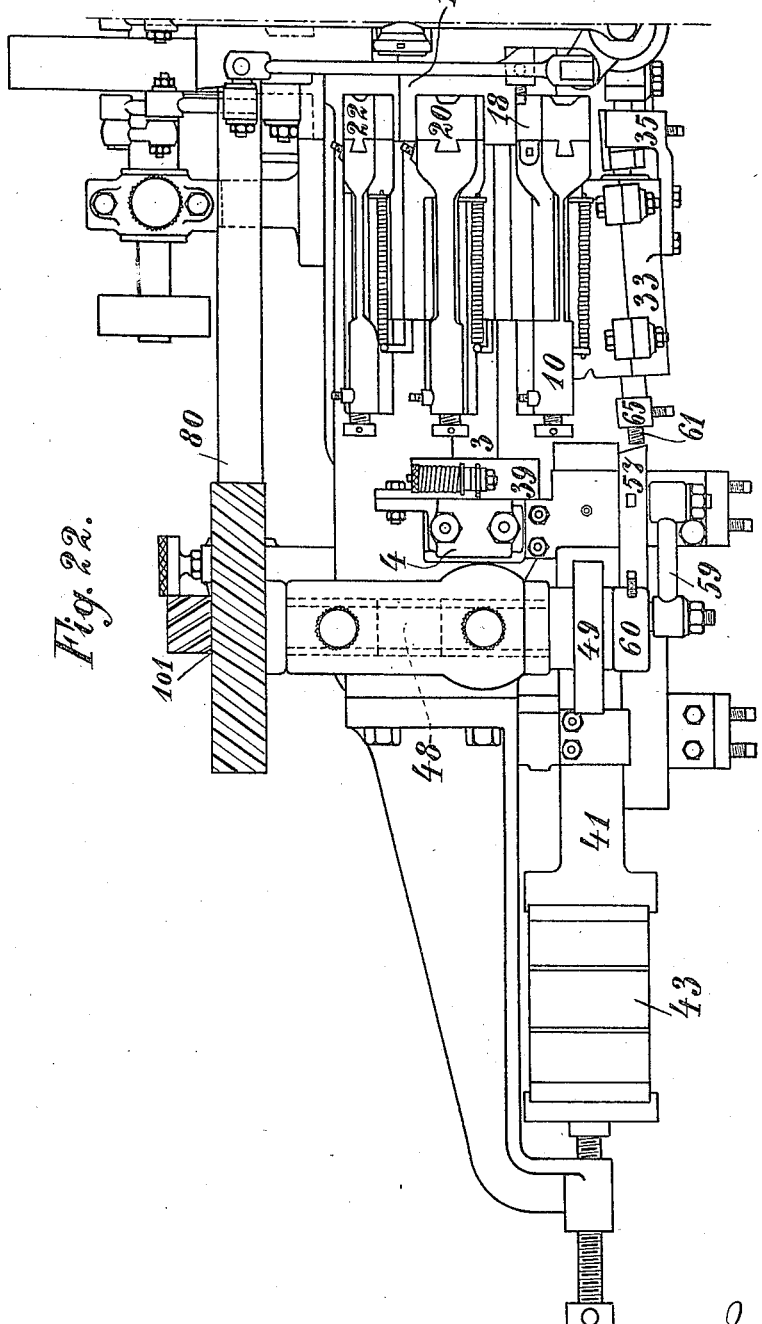

Apr. 17, 1923.  1,452,023
F. W. BINDEL
DEVICE FOR WELDING CHAIN LINKS, RINGS, AND THE LIKE
Filed Nov. 13, 1919  10 sheets-sheet 1
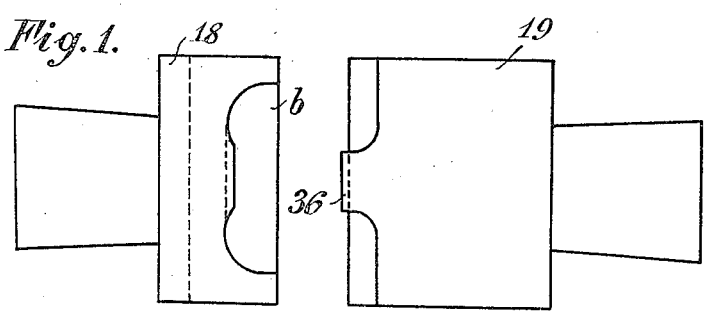
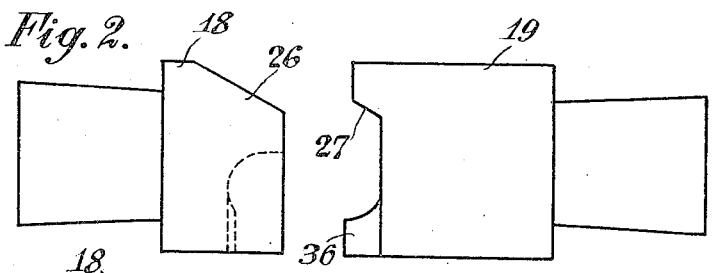
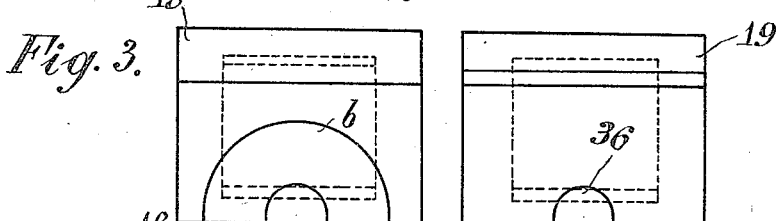
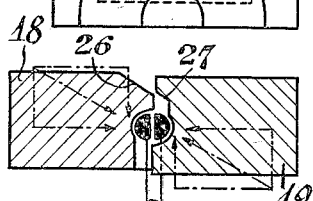 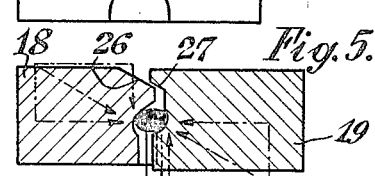
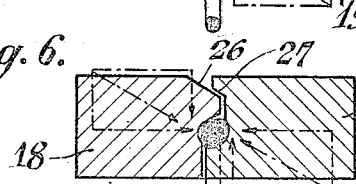 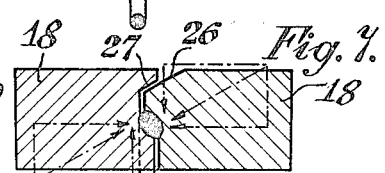
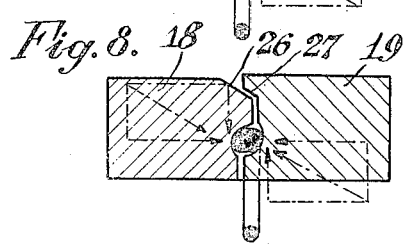 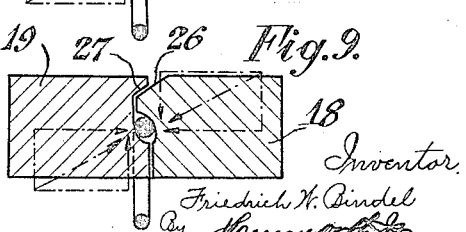

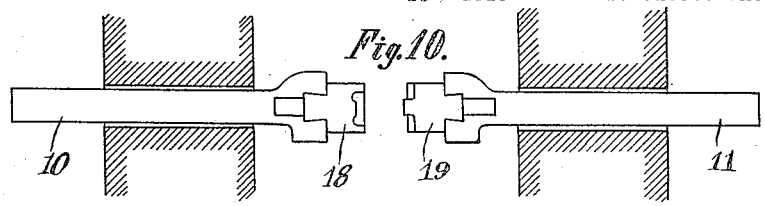
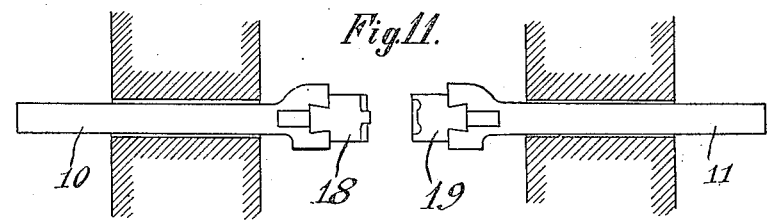
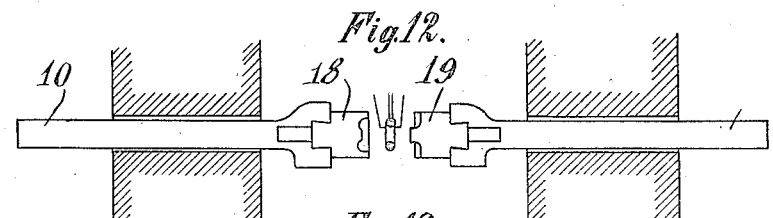
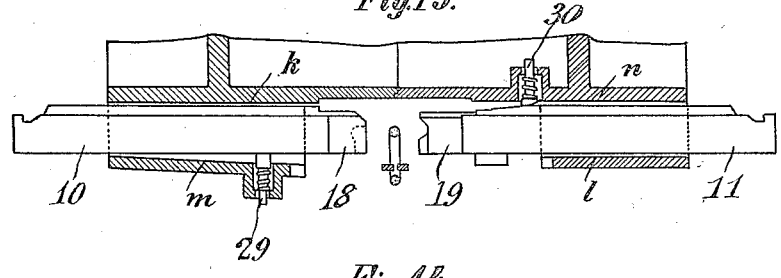
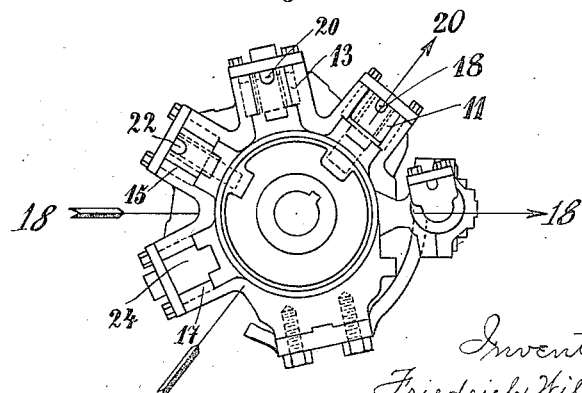

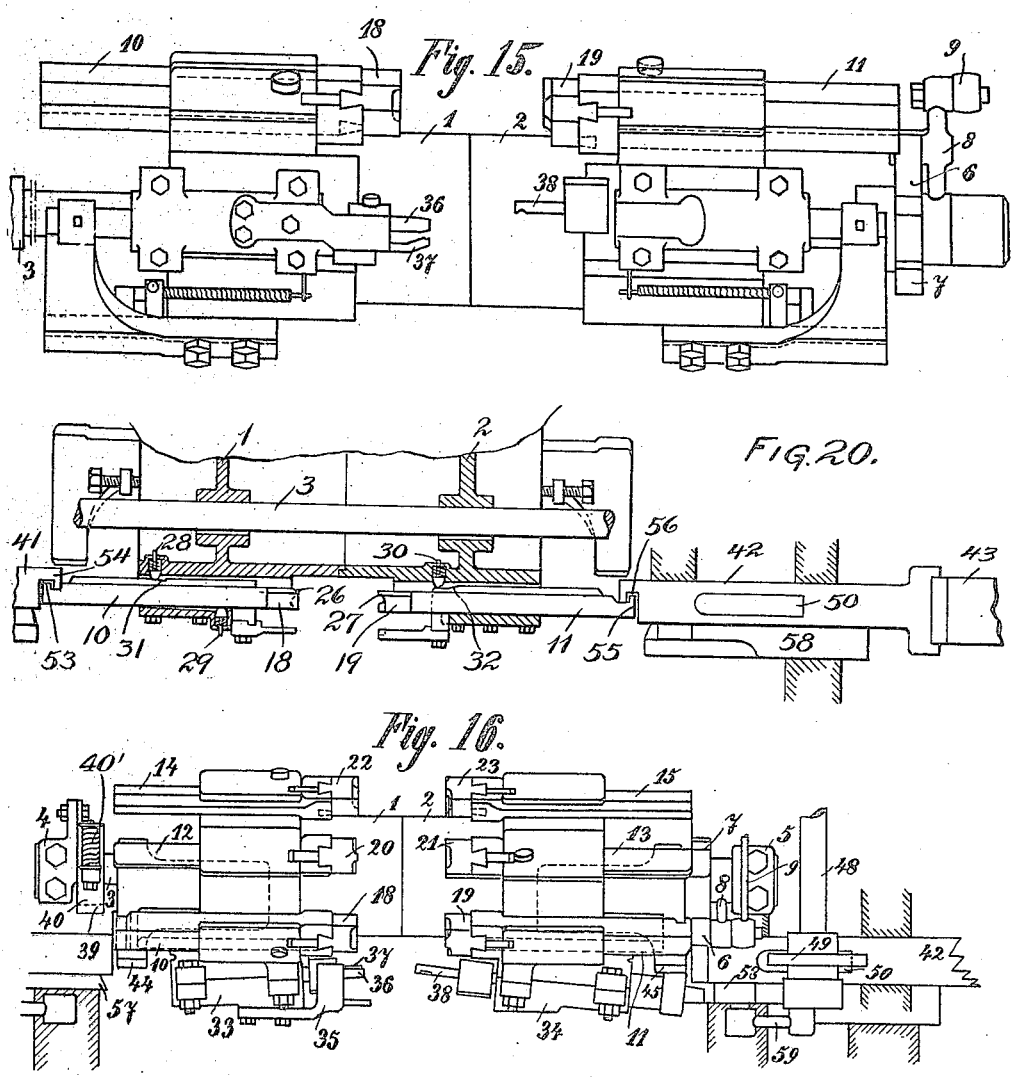

Apr. 17, 1923.
F. W. BINDEL
1,452,023
DEVICE FOR WELDING CHAIN LINKS, RINGS, AND THE LIKE
Filed Nov. 13, 1919 10 sheets-sheet 4
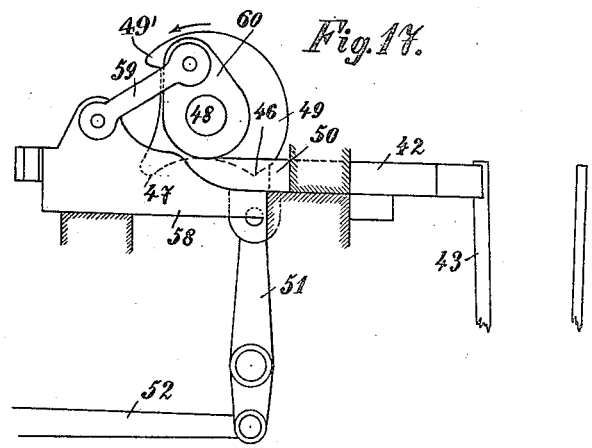
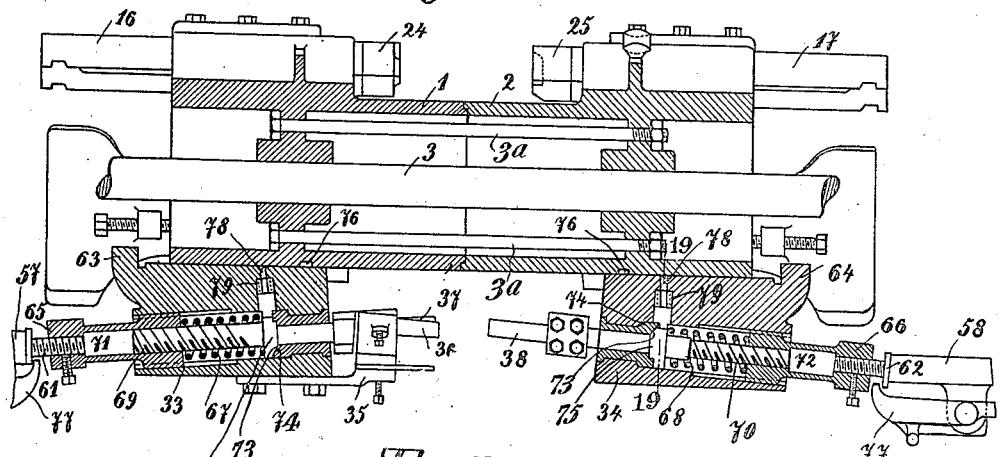
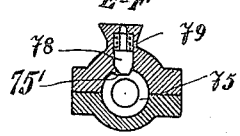

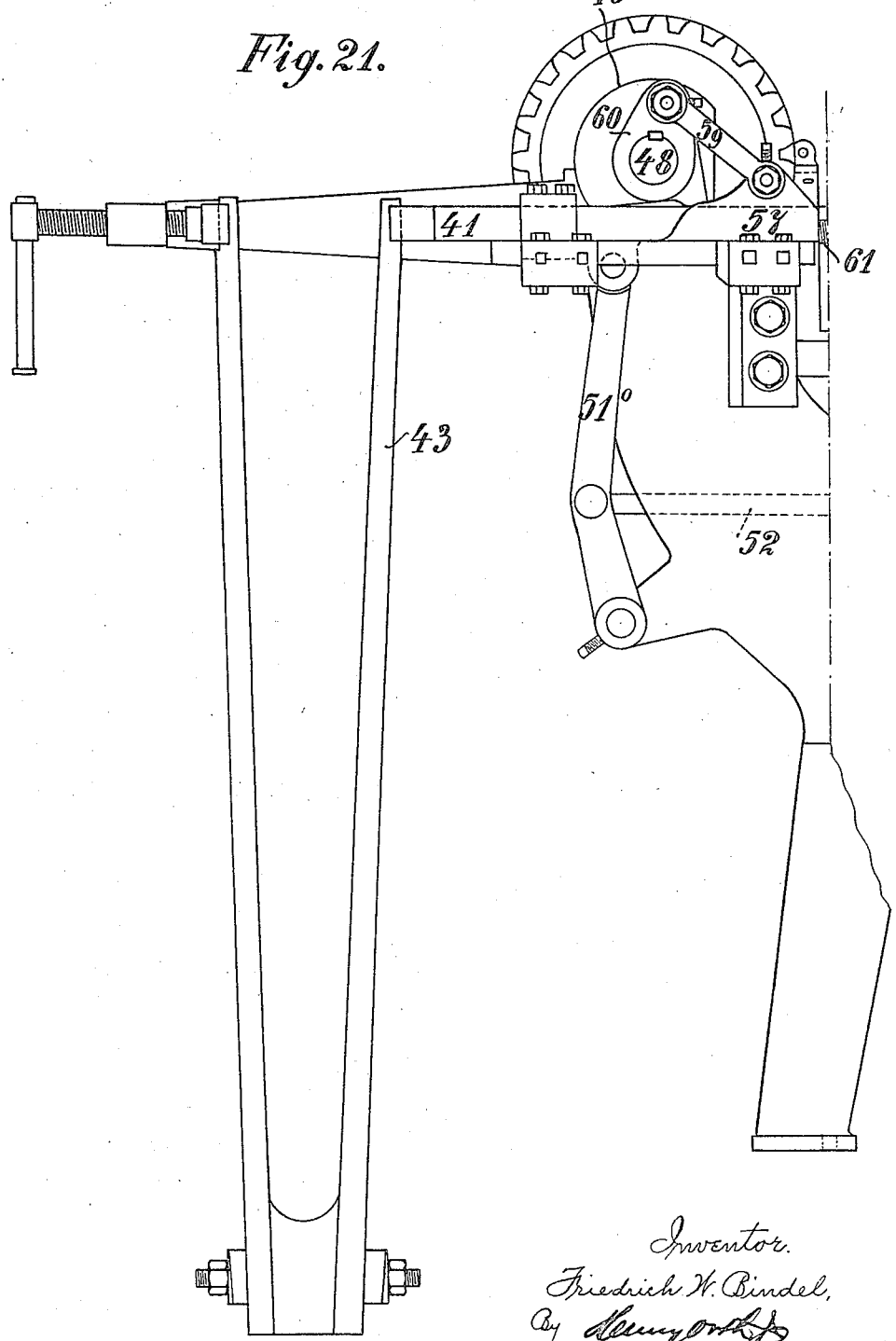

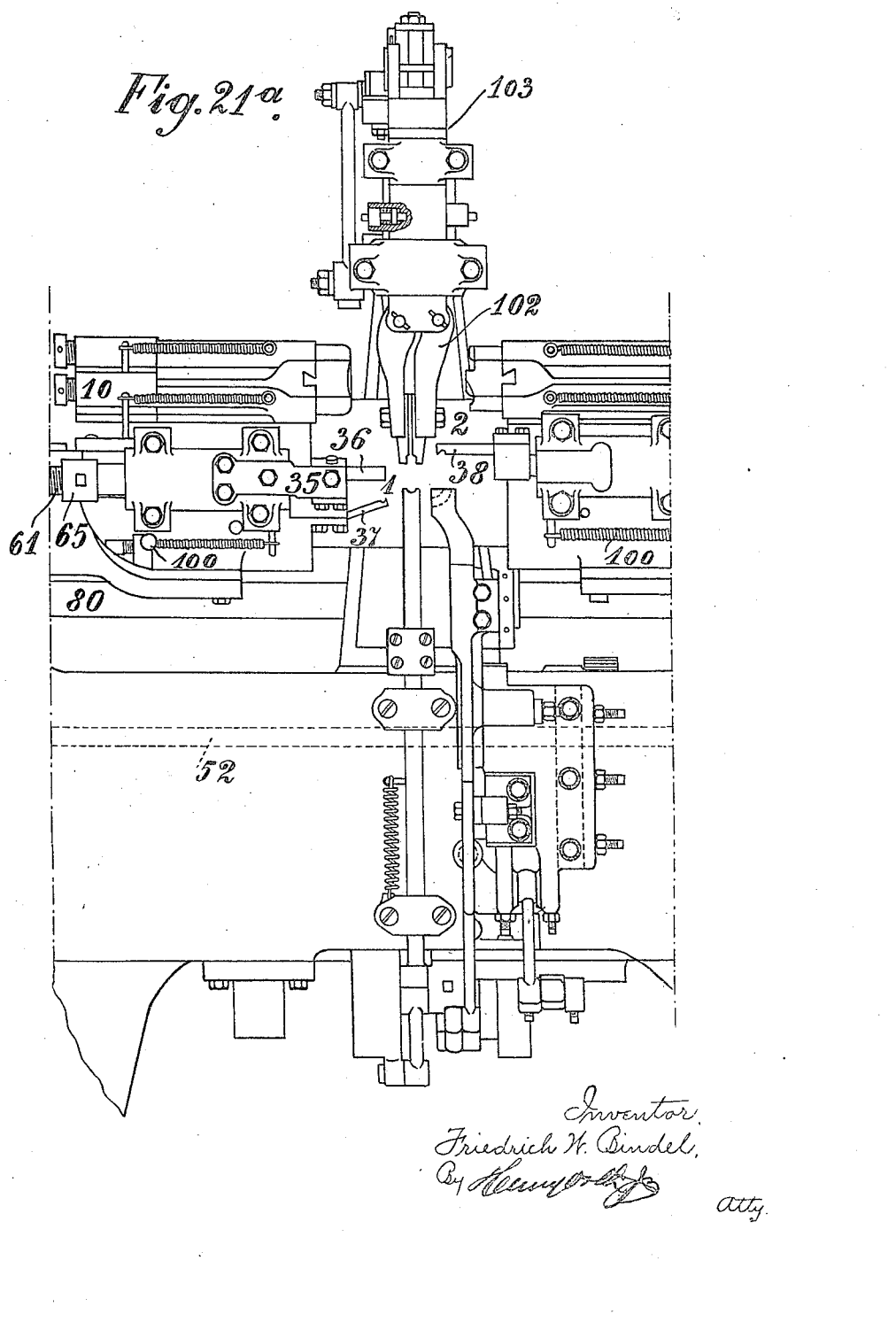

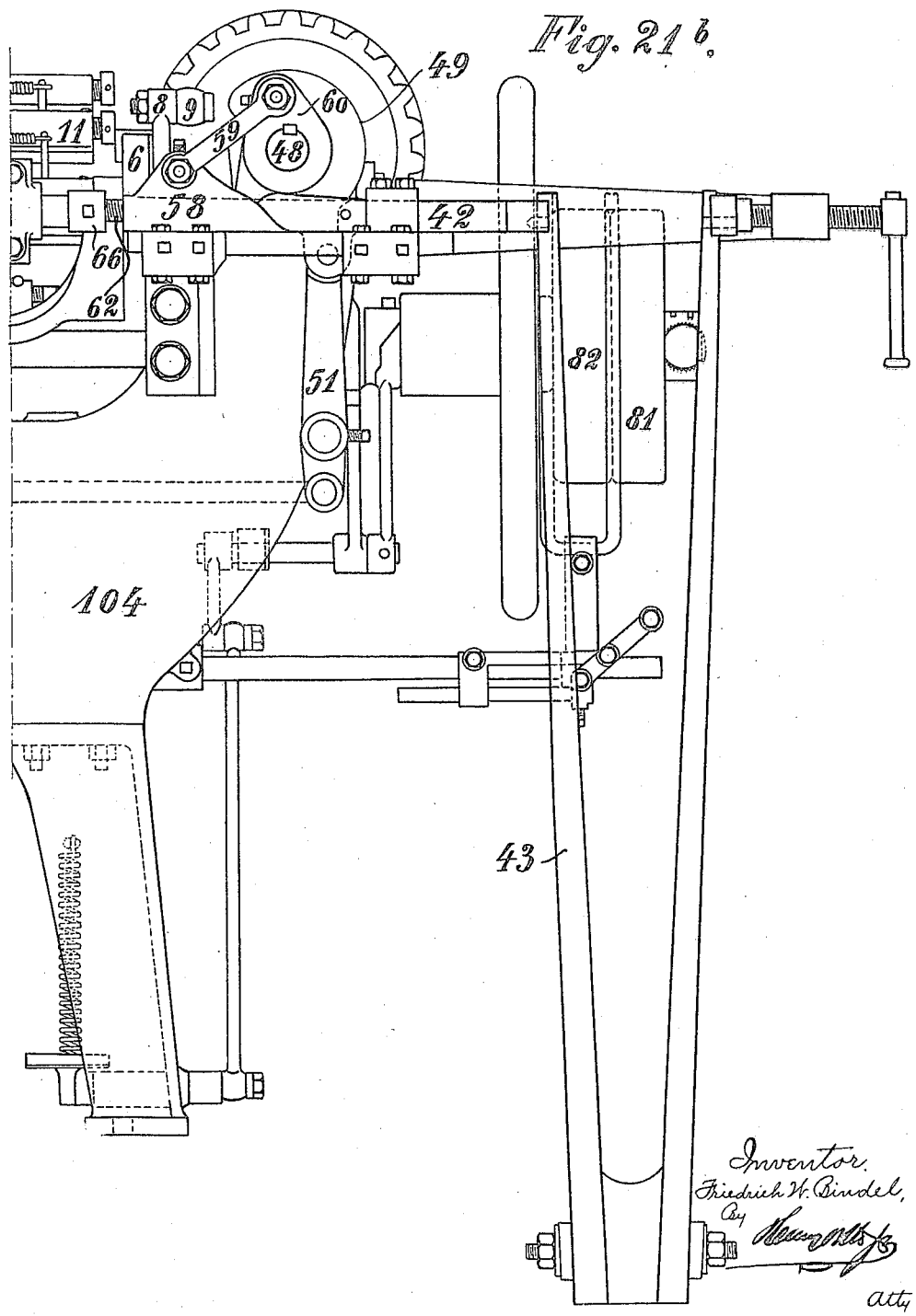

Apr. 17, 1923.

F. W. BINDEL 1,452,023

DEVICE FOR WELDING CHAIN LINKS, RINGS, AND THE LIKE

Filed Nov. 13, 1919     10 sheets-sheet 8

Inventor.
Friedrich W. Bindel,
By
Atty.

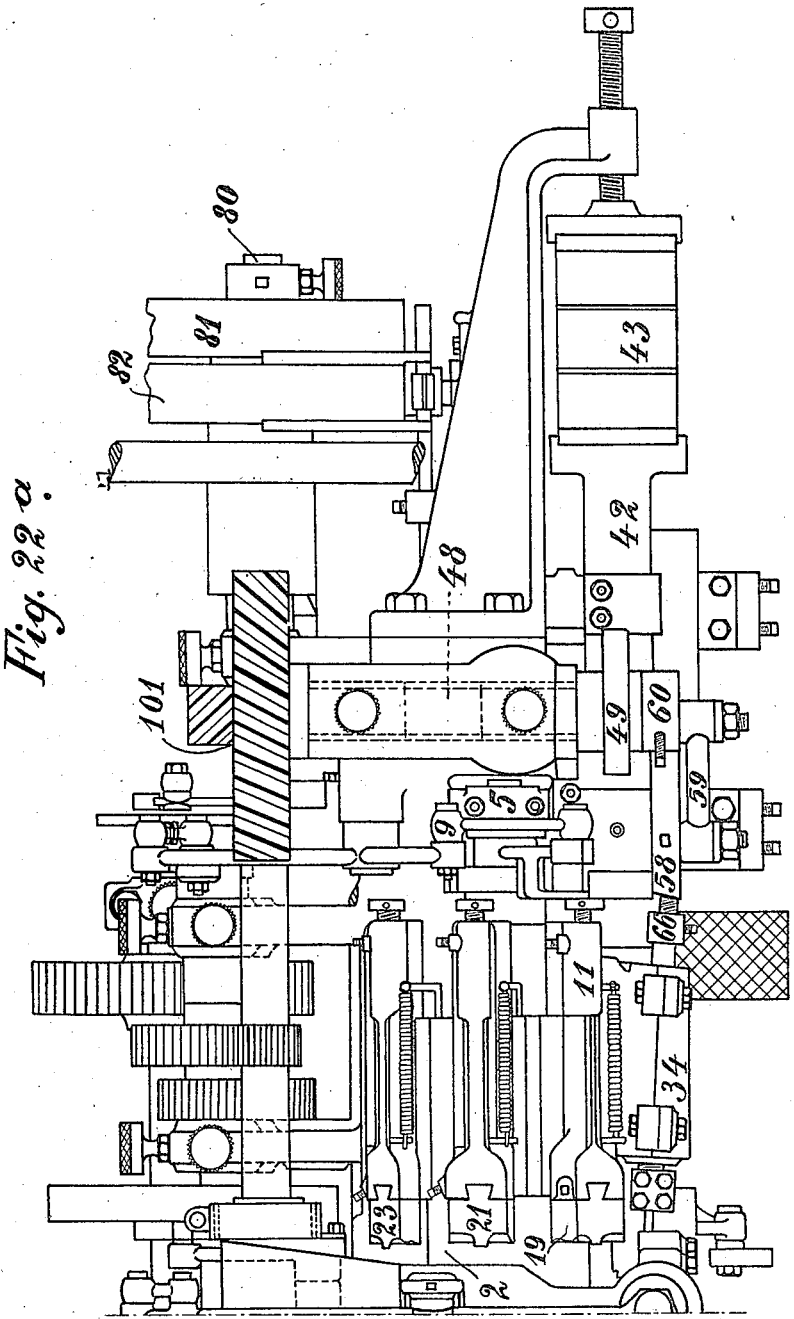

Apr. 17, 1923. 1,452,023
F. W. BINDEL
DEVICE FOR WELDING CHAIN LINKS, RINGS, AND THE LIKE
Filed Nov. 13, 1919 10 sheets-sheet 10
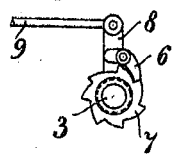
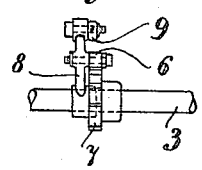
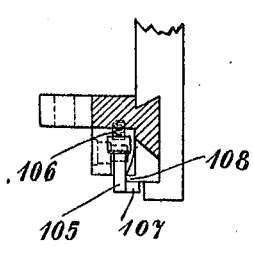
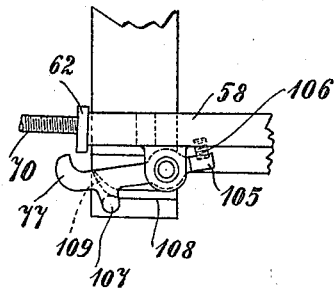
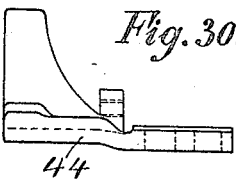
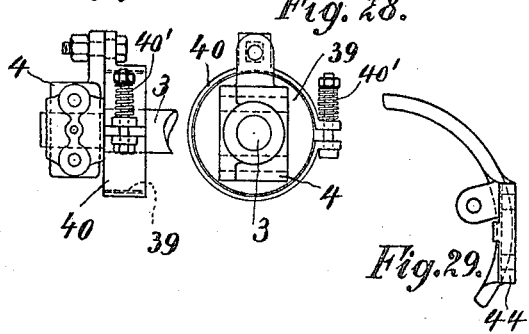
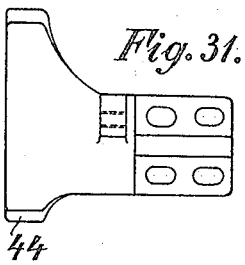
Inventor.
Friedrich W. Bindel,
By Henry Ott Jr.
Atty.

Patented Apr. 17, 1923.

1,452,023

UNITED STATES PATENT OFFICE.

FRIEDRICH WILHELM BINDEL, OF HAMBURG, GERMANY.

DEVICE FOR WELDING CHAIN LINKS, RINGS, AND THE LIKE.

Application filed November 13, 1919. Serial No. 337,832.

*To all whom it may concern:*

Be it known that I, FRIEDRICH WILHELM BINDEL, subject of Germany, residing at Hamburg, in Germany, have invented a certain new and useful Improvement in a Device for Welding Chain Links, Rings, and the like, of which the following is a specification.

This invention relates to a method of and device for welding buckles, links, rings and the like.

Heretofore in welding buckles, chain-links, rings swivel-rings and the like with the aid of sectional dies or swages the die sections were confined to movement in the direction of the same straight line as that in which the main pressure was applied. To permit the die sections to be moved towards one another, it was necessary that the blank to be operated upon or to be welded should be of the exact shape of the cavity afforded by the dies or swages and that the blank should be fitted snugly into such cavity, as otherwise a large burr or fin was unavoidably formed on the blank or the latter was deformed and the welding junction rendered uneven.

To avoid this drawback, according to the present invention, the die sections, which, as heretofore, embrace the blank laterally between them, are arranged so as to be relatively movable towards one another during the welding operation under a progressively increasing pressure and only after the sections are moved as close together as possible is the direction of the main pressure confined to substantially a single straight line or a single plane. Due to the lateral or transverse pressure, which, in addition to what may be termed the main pressure, is experienced at the welding station, the formation of burrs or fins is avoided. When the welding operation is performed in several steps or stages, that is to say when there is used a gang of dies or swages which progressively approximate to the final profile of the welded product, it is preferred to allow the resultants of the pressures of two die sections following one another on the same side of the blank to act at such an angle that the line bisecting this angle coincides with the longitudinal axis of the dies. The simplest way to produce the component force acting transversely to the longitudinal axis of the dies is to utilize inclined guiding surfaces which are provided on opposite parts of the dies and which have the effect of producing a lateral displacement of the die sections when pressure is applied to the latter in axial direction.

The invention also contemplates a construction of automatic apparatus by the aid of which bending devices are caused to act on a U-shaped blank, which may be formed with pointed or reduced ends, in such manner that, while the blank is held in a fixed position, the bending devices bring the ends to be welded into close contact and thereupon several two-part dies are brought into operation to weld the ends together. The bending device and the dies are fitted to a two-part revolver head carrying tools which are moved from opposite sides towards the blank. The operation of the dies is effected by means of actuators, while the movements of the bending devices are derived from slides subject to uniform pressure. The bending means consists of two concave tools, which, on their approach to the U-shaped blank, are given rotary movements in such wise that the ends of the blank are bent together over a mandrel.

In the accompanying drawings Figure 1 shows a pair of die sections in plan, Figure 2 is a side elevation and Figure 3 an end elevation corresponding thereto. Figures 4 to 6 are sectional views showing the dies in successive stages of operation. Figures 7 to 9 and 10 to 12 show modified arrangements of dies; Figure 13 is a detail view illustrating the means for positioning the dies. Figure 14 is an end view and Figure 15 a side elevation of a two part revolver head of an automatic chain-link welding machine. Figure 16 is a plan of the revolver head together with the actuating means. Figure 17 is a front view of the actuating means. Figure 18 is a section of the line 18—18 of Figure 14. Figure 19 is a section on the line 19—19 of Figure 18, and Figure 20 is a section on the line 20—20 of Figure 14. Figures 21, 21$^a$ and 21$^b$ combined show an elevation of the complete machine and Figures 22 and 22$^a$ combined show a plan thereof. Figs. 23 and 24 are end and side views respectively of the ratchet mechanism; Figs. 25 and 26 are detail views of the mechanism for effecting the retroactive movement of the spindles. Figs. 27 and 28 are detail views of the friction clutch shown in Figs. 16 and 22. Figs. 29, 30 and 31, are detail views of the retaining members on the revolver heads shown in Fig. 16.

Figures 1–3 illustrate a two-part die of which the section or part 18 is provided, as usual, with a cavity $b$ and the section or part 19 cooperating with the part 18 is provided with a mandrel $d$. Between the mandrel $d$ and the inner surface of the cavity $b$ the weld is produced when axial pressure is applied to the die sections. The die sections 18 and 19 are provided with inclined or wedge guiding faces 26 and 27. During the welding operation the stages of which are represented in Figures 4 to 6, the sections 18 and 19 first assume positions in staggered or offset relation (Figure 4) embracing the blank laterally between them. On approaching one another the inclined surfaces 26 and 27 are brought into contact. The consequence is that, under the effect of the axial pressure applied to the die sections, movement of the die sections will also be set up transversely to the axial direction. (Figures 5 and 6). The component force of the axial pressure and that of the lateral displacement obtained by the inclined surfaces will be combined to give a resultant, as may be gathered from the parallelogram of forces, indicated by dotted lines in Figures 4 to 9, the direction of this resultant being at an inclination to the central plane of the blank. The resultants for two opposite die sections will essentially act as a rotating couple whereby a sort of rolling of the blank takes place.

It will be realized on consideration of the foregoing that it is not necessary that the blank to be treated should be an exact fit in the cavity $b$, to ensure the avoidance of the formation of a burr or fin.

Figures 7 to 9 show the operation when there are used several dies which gradually approximate to the final shape of the welded product. The dies follow one another alternately in such manner that the mandrel and cavity act on the blank or partly shaped link alternately from opposite directions.

As will be evident, the resulting forces of two consecutively acting die sections acting on the same side of the blank will form an angle which is bisected by the longitudinal axis of the die sections or by the axil component force.

In Figures 10 to 12 is shown an apparatus comprising several superposed dies to which the blank is successively introduced, the blank being held in position during the operation, say by pliers as indicated in Figures 12 and 13, the pliers being secured to a stationary support so that the link remains in a fixed position throughout the operation. To permit relative transverse movement of the die sections 18 and 19, there are provided positioning means such as shown in Figure 13. The spindles 10 and 11 of the dies 18 and 19 are respectively urged by springs 29 and 30 against the horizontal parallel guiding surfaces $k$ and $l$ respectively, which are so positioned that the paths of the dies 18 and 19 are out of alignment. The surfaces $m$ and $n$ opposed to the surfaces $k$ and $l$ deviate from the horizontal, so that, when the inclined surfaces 26 and 27 of the dies 18 and 19 engage one another, the spindles 10 and 11 are displaced so as to follow the direction of the inclined surfaces, such lateral movement of the spindles being effected in opposition to the springs 29 and 30.

When dies are used similar to the dies 18 and 19 but having shafts the centre lines of which are not absolutely at right angles to the working surfaces, the main pressure will not be applied to both dies in a common straight line, but will be in a common plane when they both approach the blank.

In given circumstances it will be sufficient to hold one die section yieldingly.

The dies may also be used for welding by hand.

The most important member of the automatic welding machine shown in Figures 14 to 20 consists of the revolver heads 1 and 2 held together by bolts 3ª, Fig. 18 and mounted on a shaft 3. The shaft 3 is journalled at 4 and 5 and is rotated intermittently by means of a ratchet mechanism comprising a pawl 6, a ratchet wheel 7, lever 8 and connection 9 (Figures 15 16 23 and 24). The holders 10, 12, 14, and 16, and 11, 13. 15 and 17 of the two-part dies 18, 20, 22, and 24, and 19, 21, 23 and 25, respectively, are movable in the heads 1 and 2 (Figures 14, 16, and 18) being so arranged that on each of said heads 1 and 2 die sections having mandrels alternate with die sections having cavities, which progressively approximate to the final contour of the welded product. The paths of movement of the die sections towards the blank, held centrally of the machine during operation, are located in two offset planes, so that only when the die sections are in the position of greatest propinquity do the directions of pressure coincide (Figure 20). To this end, the die sections are formed with inclined surfaces 26 and 27 by the interaction of which there is effected the required lateral movement. To permit the die holders 10 to 16 to partake of such lateral movement, they are held yieldingly in their guides in the revolver heads by yielding pins 28, 29, which hold the dies in proper position before they commence to act. Pins 30 act on the die holders 11 to 17. The pins 28 and 30 slide on the inclined surfaces 31 and 32 of the die holders which retain their initial position until their ends are acted on to cause the die holders to approach one another. As the holders in the head 1 are yieldingly supported on opposite sides by pins 28 and 29 it is sufficient to permit the holders in the head 2, to move laterally in one direction only, hence the latter holders are firmly guided on the side opposite the pin 30 by an unyielding part.

The bending device comprises two main parts fitted to slides 33 and 34 (Figures 16 and 18). The holder 35 of the mandrel 36 is secured to the slide 33. About this mandrel 36 the obliquely cut ends of the U-shaped blank are bent by the aid of tools to such an extent as to bring the surfaces to be welded into contact. The tools 37 and 38 are provided with cavities and given rotational movements in opposite directions as soon as the slides 33 and 34 are moved towards one another sufficiently to bring these tools into operative relation with the blank as hereinafter described.

The ratchet wheel 7 (Figs. 23 and 24) is provided with seven teeth and consequently the revolver heads 1 and 2 are rotated intermittently in seven stages to bring the bending devices and the dies into working position. For the operation of the five sets of tools, hereinbefore referred to, five stages of movement of the revolver heads would be sufficient. Two additional stages are required, however, in the embodiment illustrated to effect the operation of parts not belonging to the invention. In order to hold the revolver heads in position after each stage of rotation there is secured to the shaft 3 a friction disk 39 (Figs. 27 and 28) with which co-operates a friction ring 40 attached to a fixed part 4 of the machine frame and compressed by a spring 40' similar to a brake or friction clutch of any known description.

The actuation of the dies 18 to 25 when in proper working position is effected by actuators, or rams 41 and 42 of which there is one at each side of the machine, each such actuator being acted upon by a wood cushion or spring 43 which is tensioned by a cam 49 adapted to withdraw the actuator away from the center of the machine (Figures 17, 20, 21 and 21ᵇ). As long as the actuators 41 and 42 are not opposite the dies, they are held back by like retaining members 44 and 45 shown in detail in Figs. 29 to 31 fitted to the revolver heads and adapted to project into the path of the actuators (Figure 16). When the actuators are to operate they are released from the cam 49, Figure 17, by the rotation of the shafts 48 in counter clockwise direction, as indicated by the arrow. The shafts 48 may be driven by any known means for instance by the worm-gearing 101 from the main shaft 80, carrying the loose and fixed pulleys 81, 82, (Figures 21 and 22.) Immediately the point 46 of the cam 49 passes clear of the end of the slot 50 remote from the centre of the machine the actuator 42 is forced towards the centre of the machine by the action of the spring 43. As the shaft 48 rotates further, the pointed tappet 47 engages the same end of the slot 50 and again forces the actuator outwards against the action of the spring 43. On the passage of this tappet 47 clear of the end of the slot 50 the actuator is again free to act. The end 49' of the circular part of the cam following the tappet 47 now engages the end of the slot 50 and again withdraws the actuators 41—42 against the action of the spring 43 and holds it in position for the desired period, i. e., as long as the circular part of the cam 49 is in engagement with the end of the slot 50 remote from the centre of the machine. As soon as the actuators are released, they act on the die holders 10 and 11 and the dies 18 and 19 are forced against the blank. To ensure that the dies shall always strike at the same point, the actuator 41 is engaged by a one-armed lever 51° and the actuator 42 by a two-armed lever 51 (Figures 21, 21ᵃ, and 21ᵇ) connected to the one-armed lever by a link 52 thus ensuring that the actuators operate at the same time. The return movement of the actuators 41 and 42 into their idle position is effected by the cam 49. The rotation of the heads 1, 2 carries the hooked ends 53, 55 of the die holders 10, 11 into the notches 54, 56, of the actuators 41, 42 just as the clearance of the retaining members 44, 45 occurs. The die holders are thus restored to initial position relatively to one another.

The operation of the bending device is effected under uniform axial pressure, by the aid of driving slides 57 and 58 (Figures 16, 17, 18, 21 and 22) guided on one side of the actuators 41 and 42 and acting upon the slides 33 and 34. Each of the slides 57 and 58 is operated by a link 59 and a crank 60 on the shaft 48. The ends of the slides 57, 58 do not directly engage the slides 33 and 34, but engage adjustable screws 61, 62 threaded into nut-forming plungers 65, 66 in key and feather engagement with the slides 33, 34, the nuts 65 and 66, of which the threads are of rapid pitch, being restrained against rotation. When stops 63, 64, Figure 18, on the slides 33 and 34 abut against the end surface of the revolver heads, the further movement of the slides 57 and 58 pressing against the nuts 65 and 66 or rather against screws 61 and 62 effects longitudinal motion of the nuts 65 and 66 in opposition to the pressure of the springs 67 and 68. In consequence, corresponding screw-threaded spindles 69 and 70 secured to the bending devices 37 and 38 screw into cavities 71, 72 in the nuts 65, 66 and thus perform rotary movements, whereby the bending devices 37 and 38 are rotated in opposite directions about the mandrel 36. In order to allow the bending devices 37 and 38 to pass one another when rotating in opposite directions, each spindle 69 and 70 has an integral collar or cam 75 formed with a lateral cam surface 73 engaging a cam surface 74 found in the sides, so that when the spindles 69 and 70 are rotated the two cam surfaces 73 and 74 co-operate to retract the spindles, relative to the slides. The springs 67 and 68 are stronger than springs 100 attached to the revolver heads, engaging the slides and tending to hold the slides 33, 34 in initial position, so that by the action of the slides 57, 58 first the slides 33, 34 and then the nuts 65 and 66 are operated.

In order to prevent backward movement of the slides 33 and 34, before the spindles 68 and 70 are rotated there are fitted to the slides 33, 34 pins 78 pressed by springs 79 against cams 75 fitted to the spindles 69 and 70 (Figure 19). The cams 75 have notches 75' into which pins 78 project to allow the bending tools to reciprocate. The pins 78, which during the bending operation enter slots 76 in the revolver heads, remain in engaging position until the spindles 69 and 70 are finally turned backward. In this position the pins will project into the notches 75' of the cams 75 and release the slides 33 and 34. A similar operation takes place on the forward movement of the slides 33, 34, the spindles 69 and 70 being prevented from rotation until the forward movement of the slides 33, 34 is completed.

In order to ensure positive return motion of the bending devices, there are pivoted to the slides 57 and 58 retracting members 77 which engage behind the heads of the screws 61 and 62 on the return movement of the slides 57 and 58.

As shown in Figs. 25 and 26, each retractive member is provided at its rear end with a prolongation 105 and between the latter and the slides 57—58 is interposed a spring 106 tending to move the front hooked end of the member toward the screw spindles 69—70. Each member 77 is moreover provided with a finger 107 which on the forward movement of the slides engages a cam surface 108 formed with a sloping inwardly extending end 109. When the fingers 107 engage the ends 109 the retractive members 77 will be moved towards the screws 61—62 and catch behind their heads. When the bending has been completed, the slides 57—58 will be retracted taking with them the nuts 65—66 and the spindles 69 and 70. When the nuts have returned to their initial positions the slides 33 and 34 will be retracted to such an extent that the retractive members 77 are withdrawn, by the ends 109 of the cams 108 from the heads of the screws 61—62.

The pliers 102 holding the blanks during operation may be arranged on a bracket 103 attached to the frame 104 by any known means.

I claim:—

1. A welding mechanism comprising rotary heads, a plurality of die sections movably mounted in said heads, means for longitudinally moving said sections towards a blank to be welded, and means to rotate the heads to successively move the dies into operative relation to the article to be welded.

2. A welding mechanism comprising two heads, means for intermittently rotating said heads, a plurality of die-sections movably mounted in the heads, and an actuator adjacent each head adapted to act in succession on each die section as the latter move into operative relation to a blank.

3. A welding mechanism comprising two heads, means for intermittently rotating said heads, a plurality of die-sections movably mounted in the heads, an actuator adjacent each head adapted to act in succession on each die section as the latter move into operative relation to a blank, and means on each actuator adapted to engage the die sections to withdraw them from a blank.

4. A welding mechanism comprising two heads, means for intermittently rotating said heads, a plurality of die sections movably mounted in said heads, an actuator adjacent each head adapted to act in succession on each die section as the latter move into operative position to a blank to be welded, and means fitted to the heads to retain the actuators in operative position.

5. A welding mechanism comprising two rotary heads, a plurality of die sections movably mounted in said heads, and means for actuating the die sections including a ram adjacent each head adapted to successively engage the die-sections, operating levers, and links connecting the latter to the rams.

6. A welding mechanism comprising two heads, means for rotating said heads, a plurality of die sections movably mounted in the latter, and means movable in said heads for bending the ends of U-shaped blanks to bring them together before engagement by the dies.

7. A welding machine comprising two heads, means for intermittently rotating said heads, a plurality of die sections movably mounted in the latter, bending devices mounted on the heads having cavities adapted to engage the ends of a U-shaped blank, and a mandrel cooperating with the bending devices.

8. A welding machine comprising two heads, means for intermittently rotating said heads, a plurality of die sections movably mounted in the latter, slides carried by the heads, bending devices mounted in the slides, actuators for the latter, and cranks for operating the actuators.

9. A welding machine comprising two heads, means for intermittently rotating said heads, a plurality of die sections movably mounted in the latter, slides carried by the heads, bending devices mounted in the slides, screw-threaded spindles connected to the bending devices, spring pressed nuts on the spindles and mounted for non-rotational movement within the slides, and means to drive the slides longitudinally.

10. A welding machine comprising two heads, means for intermittently rotating said heads, a plurality of die sections movably mounted in the latter, slides carried by the heads, bending devices mounted in the slides, screw-threaded spindles connected to the bending devices, spring pressed nuts on the spindles and mounted for non-rotational movement within the slides, means to drive the slides longitudinally, said slides having inclined surfaces engaged by the spindles whereby a retractive movement is imparted to the latter when rotated.

FRIEDRICH WILHELM BINDEL.

Witnesses:
   EMIL HAGER,
   FRIEDR. OESTERLIN.